United States Patent [19]

Skrobisch

[11] 4,425,864

[45] Jan. 17, 1984

[54] ROTOR FOR ELECTROMAGNETIC INDICATOR

[75] Inventor: Alfred Skrobisch, Commack, N.Y.

[73] Assignee: The Staver Company, Inc., Bay Shore, N.Y.

[21] Appl. No.: 346,373

[22] Filed: Feb. 5, 1982

[51] Int. Cl.³ .......................... G01D 5/12; G08B 5/24
[52] U.S. Cl. ................................ 116/204; 116/298;
116/297; 335/272; 340/815.26
[58] Field of Search ...................... 116/284, 204, 298;
335/225, 272; 340/825.79, 815.26; 235/84

[56] References Cited

U.S. PATENT DOCUMENTS

| | | | |
|---|---|---|---|
| 2,004,724 | 6/1935 | Herzog | 116/298 X |
| 2,767,357 | 10/1956 | Naybor | 335/272 |
| 3,193,195 | 7/1965 | Jeffries | 116/204 X |
| 3,368,216 | 2/1968 | Rose | 340/815.26 |
| 3,434,658 | 3/1969 | Goldstein | 116/298 X |
| 3,915,112 | 10/1975 | Forester | 116/204 X |
| 3,975,728 | 8/1976 | Winrow | 340/815.26 |
| 3,977,072 | 8/1976 | Schonstedt | 29/602 R |
| 3,977,248 | 8/1976 | Metzger | 116/204 X |
| 4,053,828 | 10/1977 | Ambler et al. | 29/602 R X |
| 4,156,872 | 5/1979 | Helwig | 340/825.79 X |

*Primary Examiner*—Daniel M. Yasich
*Attorney, Agent, or Firm*—Edward H. Loveman

[57] ABSTRACT

A rotor for an electromagnetic indicator comprises a flat circular disk made of thin, pliable, nonmagnetic material. The disk has integral tabs extending out of diametrically opposite edges and a rib extends diametrically of the disk to outer ends of the tabs. The rib and tabs define T-shaped trunnions which engage in T-shaped slots in respective sides of a rotary magnet, and a journal block. The disk is fabricated from a single flat sheet having flat tabs extending outwardly of opposite edges. A V-shaped groove is made in the sheet extending centrally across the disk and tabs. Opposite sides of the groove are then brought together to form the rib with T-shaped trunnions at opposite edges of the disk.

9 Claims, 12 Drawing Figures

ROTOR FOR ELECTROMAGNETIC INDICATOR

This invention concerns a rotor for an electromagnetic indicator of the type described in my copending U.S. Pat. Application Ser. No. 340,309, filed Jan. 18, 1982 now U.S. Pat. No. 4,393,362 which issued on July 1, 1983.

Heretofore it has been conventional to fabricate an indicator disk and trunnions for a rotor of an electromagnetic indicator as separate elements which are then secured together by cementing, welding, or other method of attachment, such as shown in U.S. Pat. No. 4,156,872. Where the disk has been made with integral trunnions, the trunnions were very thin, quite fragile, and easily bent and broken. Another disadvantage of prior rotor disks was that they readily warped and bent when made very thin and light.

The present invention is directed at overcoming the above and other disadvantages in structure and method of fabrication of prior electromagnetic indicator rotors.

It is therefore, a principal object of the present invention to provide an improved rotor for an electromagnetic indicator comprising a novel rotary disk structure which has an integral diametral rib and integral T-shaped trunnions to engage in corresponding T-shaped slots in a respective rotary magnet and journal block at opposite ends of the disk.

A further object of the present invention is to provide a novel method of fabricating a rotary disk for an electromagnetic indicator, wherein a reinforcing diametral rib and T-shaped trunnions are integrally formed with the disk.

These and other objects and many of the attendant advantages of this invention will be readily appreciated as the same becomes better understood by reference to the following detailed description when considered in connection with the accompanying drawings in which.

Figure 5:
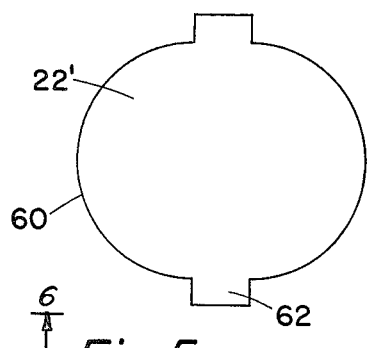
Figure 7:
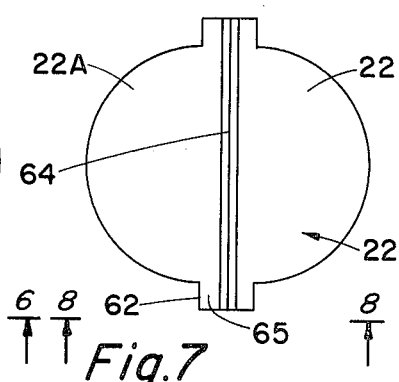
Figure 9:
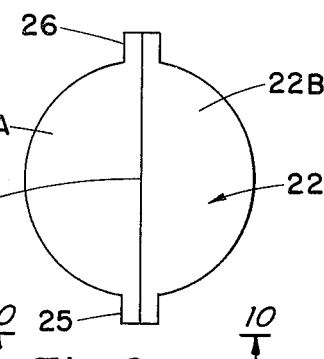
Figure 6:
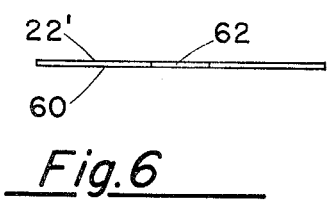
Figure 8:
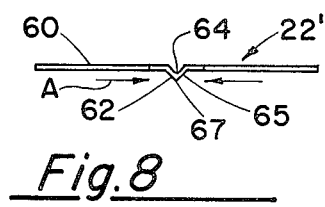
Figure 10:
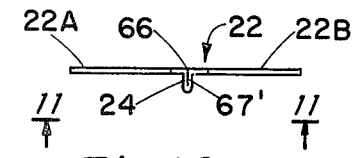
Figure 11:
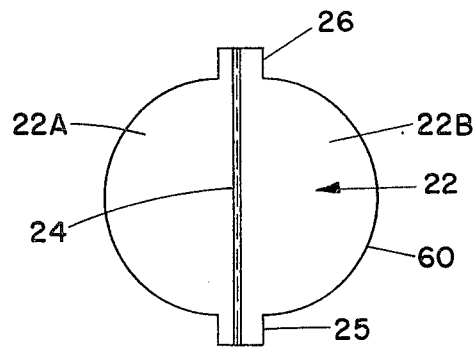

FIGS. 5, 7, and 9 are reduced plan views of a rotary disk shown at successive stages of fabrication;

FIGS. 6, 8, and 10 are end elevational views taken along lines 6—6, 8—8 and 10—10 of FIGS. 5, 7, and 9, respectively; and FIG. 11 is a bottom plan view of the completed disk taken along line 11—11 of FIG. 10.

Referring now to the drawings wherein like reference characters designate like or corresponding parts throughout, there is illustrated in FIGS. 1, 2, 3, and 3A, an electromagnetic indicator generally designated as reference numeral 10 having a rectangular U-shaped stand 12 provided with a horizontal base 14 and upright supports 16, 18 at opposite ends. The stand 12 rotatably supports a rotor 20 which embodies the present invention.

Figure 4:
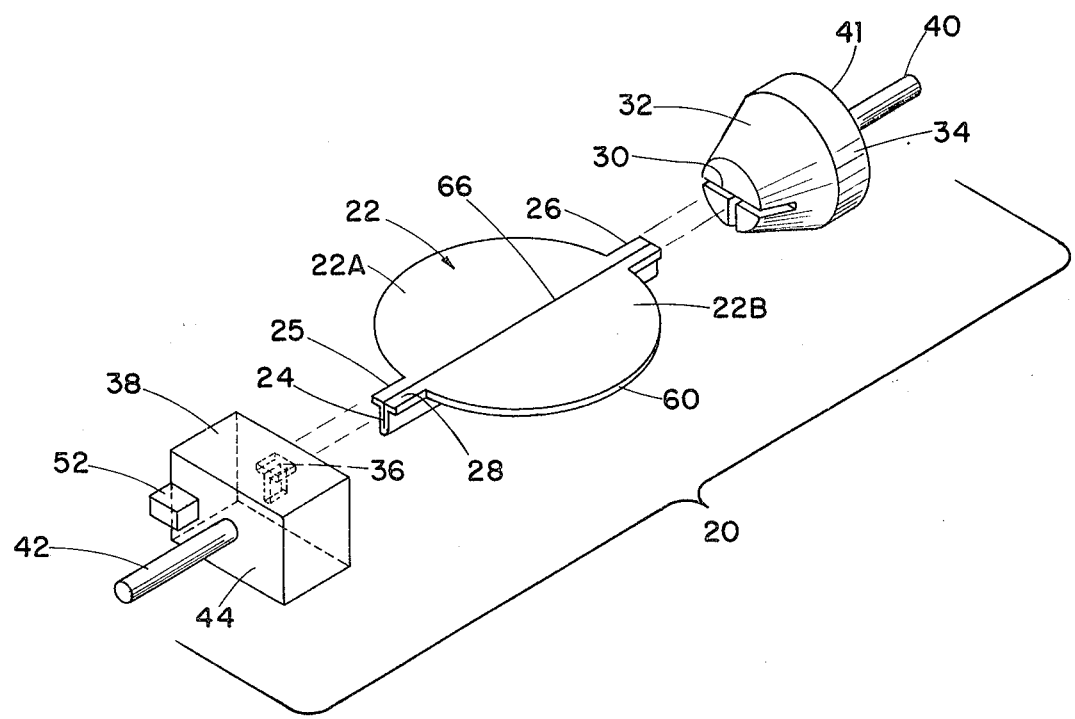
FIG. 4 is an enlarged exploded perspective view showing parts of the rotor embodying the present invention.

The rotor 20 comprises a substantially circular disk 22; (see FIG. 4) which may have differently colored opposite sides or carry certain indicia on one or both sides which are selectively displayed when the rotor is rotated electromagnetically. The disk 22 is provided with an integral diametral rib 24 which extends fully across and centrally of the disk 22 at one side and extends outwardly beyond the disk at diametrically opposite points to define pedestals of two T-shaped trunnions 25, 26 (FIG. 4). The trunnions 25 and 26 are comprised of laterally extending respective tabs 28 of the disk 22 which is preferably formed from a sheet of thin pliable nonmagnetic material such as aluminum.

One of the trunnions 26 is inserted and frictionally engaged in a T-shaped slot 30 formed in a frustoconical axial extension 32 of a cylindrical magnet 34. The other trunnion 25 is inserted and engaged in a T-shaped slot 36 formed in one side of a trunnion and stop block 38. The magnet 34 has an axial shaft 40 extending outwardly of outer side 41 which is opposite the slot 30. The block 38 has a shaft 42 extending outwardly of the outer side 44 which is opposite the slot 36. The shafts 40 and 42 are journaled in bearings 46 secured to outer sides of the supports 16 and 18.

Figure 1:
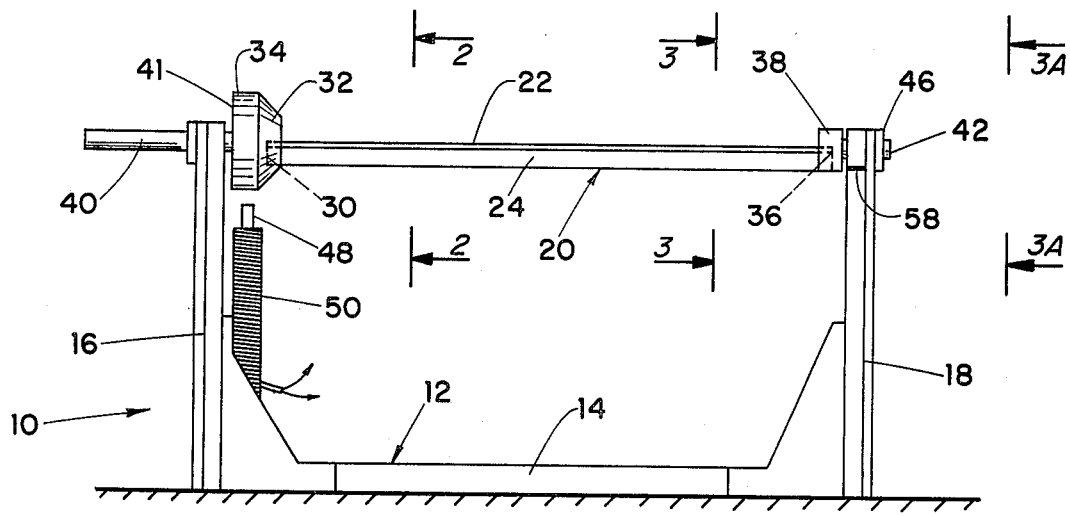
FIG. 1 is a side elvational view of an electromagnetic indicator provided with a rotor embodying the present invention.
Figure 2:
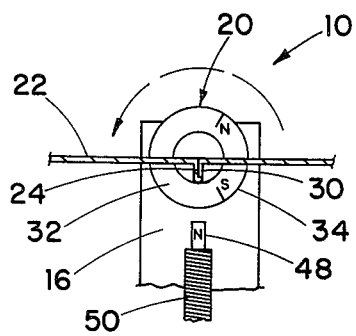
FIG. 2 and FIG. 3 are fragmentary cross-sectional views taken along lines 2—2 and 3—3 respectively in FIG. 1.
Figure 3:
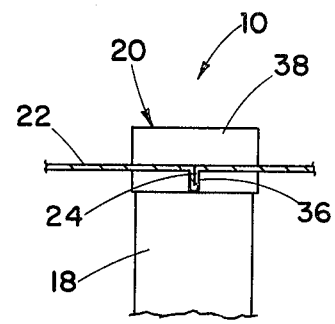
Figure 3A:
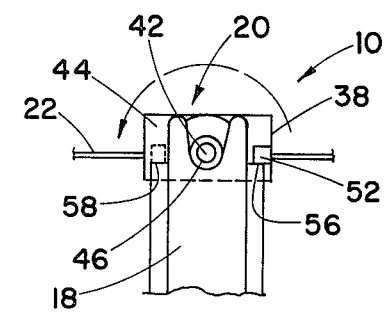
FIG. 3A is a fragmentary end elevational view taken along line 3A—3A of FIG. 1.

An axially upright permanent magnetic core on pole piece 48 is wound with a wire coil 50 and is mounted on the base 14. The upper end of the pole 48 is disposed adjacent axially horizontal cylindrical magnet 34 which is magnetized at spaced points N and S; see FIG. 2. A lug 52 extends outwardly of the block 38 integral with the side 44 of the block 38 as best shown in FIG. 4. The lug 52 serves as a stop member to engage on shoulders or abutments 56 or 58 spaced apart at opposite lateral ends of the stand support 18, as best shown in FIGS. 1 and 3A. The lug 52 and abutments 56 and 58 limit angular rotation of the rotor 20 when the coil 50 is energized.

FIGS. 5-11 show successive steps in fabrication of the rotary disk 22. A flat plate 22' having semicircular edges 60 is shown in FIGS. 5 and 6 and has flat tabs 62 extending out of diametrically opposite points of the edges 60. In the next step of fabrication a V-shaped groove 64 is formed extending diametrally across the plate 22' including the tabs 62 as shown in FIGS. 7 and 8. At the next stage of fabrication sides 65 of the groove 64 are pressed inwardly toward each other at an apex 67 as indicated by arrows A in FIG. 8. This brings the symmetrical semicircular sections 22 A and 22 B together in coplanar relationship to meet along a diametral line 66 shown in FIGS. 9 and 10. At the same time the sides 65 are brought in parallel abutment along their full length to define the rib 24 which has a thickness twice equal to the sum of the semicircular sections 22A and 22B. The sides 65 are integrally joined at a bend 67'. The plane of the rib 24 is perpendicular to the plane of the disk 22. The T-shaped trunnions 25 and 26, thus formed at diametrically opposite points on the disk 22 are engaged by snug frictional fit in the T-shaped slots 30 and 36 of the magnet 34 and block 38 respectively. In this T-shaped rigid structure the disk 22 is securely fixed in place with respect to the magnet 34 and block 38. The disk 22 cannot rotate with respect to the block 38 and the strong T-shaped trunnions cannot bend or break. This contrasts with prior rotor structures where individual fragile, bendable, or breakable or round ends of a narrow shaft were inserted into holes in the magnet and journal bearing. The double thick rib 24 reinforces and strengthens the disk 22. The disk 22 may be made of a thin, pliable nonmagnetic material such as aluminum. It is very light in weight so that the rotor 20 can turn with minimum inertia when the coil 50 is energized electrically to generate a magnetic field which turns the rotary magnet 34, the disk 22, and the journal block 38 as a unit. For some applications it is possible to manufacture the disk 22, the rib 24, and the T-shaped trunnions 25, 26 as an integral unit from a suitable strong, lightweight, plastic material.

It should be understood that the foregoing relates to only a preferred embodiment of the invention which has been by way of example only and that it is intended to cover all changes and modifications of the example of the invention herein chosen for the purposes of the disclosure, which do not constitute departures from the spirit and scope of the invention.

What is claimed is:

1. A rotor for an electromagnetic indicator, comprising a flat disk having means integrally connecting magnet at one edge and a stop block at the opposed edge, said flat disk made of lightweight material:

said connecting means including integral tabs extending outwardly of the opposite edges of said disk; and a reinforcing rib integral with said disk and said tabs, said rib extending across said disk centrally thereof in a plane perpendicular thereto beyond the opposite edges thereof to outer ends of said tabs.

2. A rotor as defined in claim 1, wherein said tabs and said rib define a T-shaped trunnion at the opposite ends of said disk.

3. A rotor as defined in claim 2, further comprising a generally cylindrical magnet having a T-shaped slot in one side to receive one of said trunnions.

4. A rotor as defined in claim 3, wherein said magnet has a frustoconical lateral axial extension in which said one T-shaped slot is formed.

5. A rotor as defined in claim 2, wherein said stop block comprises a journal block having a T-shaped slot in one side thereof to receive the other one of said T-shaped trunnions.

6. A rotor as defined in claim 5, wherein said magnet and said block further have shafts extending axially outwardly of sides of said magnet and said block opposite from said T-shaped slots, arranged for rotatably supporting said rotor in the electromagnetic indicator.

7. A rotor as defined in claim 5, wherein said block has a lug extending outwardly of one of said opposite sides to serve as a stop element for limiting angular rotation of said disk in said indicator.

8. A rotor as defined in claim 7, wherein said material of said disk is thin pliable metal to facilitate forming said rib of double thickness.

9. A rotor as defined in claim 1, wherein said rib is formed of a double thickness of said material.

* * * * *